(12) United States Patent
Schaefer

(10) Patent No.: US 10,486,620 B2
(45) Date of Patent: Nov. 26, 2019

(54) INSULATION MODULE FOR MOTOR VEHICLE AND MOTOR VEHICLE

(71) Applicant: GM GLOBAL TECHNOLOGY OPERATIONS LLC, Detroit, MI (US)

(72) Inventor: Thilo Schaefer, Gross-Gerau (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 8 days.

(21) Appl. No.: 15/880,183

(22) Filed: Jan. 25, 2018

(65) Prior Publication Data

US 2018/0208132 A1   Jul. 26, 2018

(30) Foreign Application Priority Data

Jan. 25, 2017   (DE) .................. 10 2017 000 638

(51) Int. Cl.
*B60R 13/08*   (2006.01)
*B60N 3/04*   (2006.01)
*B62D 25/20*   (2006.01)

(52) U.S. Cl.
CPC ............ *B60R 13/083* (2013.01); *B60N 3/048* (2013.01); *B62D 25/20* (2013.01)

(58) Field of Classification Search
CPC ..... B60R 13/083; B60N 3/048; B29C 48/288; B29C 48/425; B29C 48/435; B29C 48/59; B29C 48/655; B62D 25/20
USPC ......................................... 296/39.3; 428/172
See application file for complete search history.

(56) References Cited

U.S. PATENT DOCUMENTS 8,622,456 B2 *   1/2014   Preisler ................. B60R 13/013
                                                                 296/193.07
2004/0229019 A1 *   11/2004   Tilton ...................... B32B 3/04
                                                                 428/172
2009/0065298 A1   3/2009   Ueno

* cited by examiner

*Primary Examiner* — Joseph D. Pape
*Assistant Examiner* — Dana D Ivey
(74) *Attorney, Agent, or Firm* — Lorenz & Kopf, LLP

(57) ABSTRACT

An insulation module for a floor of a motor vehicle includes a panel of a molded and bound fiber material. The panel extends along a longitudinal axis (X). At least one notch is formed in the thickness direction (D) of the panel and extends at an angle between 0° and 30° to the longitudinal axis (X). At least one incision is formed in an outer edge of the panel and extends at an angle between 80° and 100° to the longitudinal axis (X) of the panel.

10 Claims, 5 Drawing Sheets

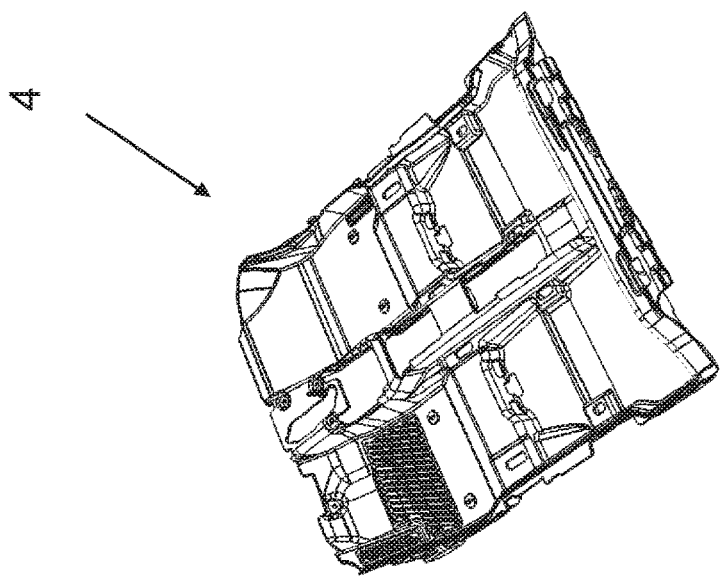
Figure 2A - Prior Art
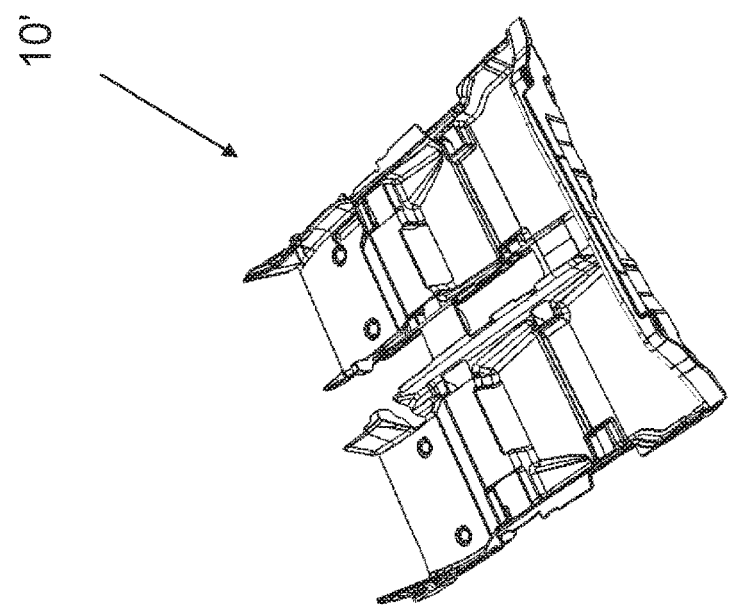
Figure 2B - Prior Art

INSULATION MODULE FOR MOTOR VEHICLE AND MOTOR VEHICLE

CROSS-REFERENCE TO RELATED APPLICATION

This application claims priority to German Patent Application No. 102017000638.5, filed Jan. 25, 2017, which is incorporated herein by reference in its entirety.

TECHNICAL FIELD

The present disclosure pertains to an insulation module for use in a motor vehicle and to a motor vehicle that is equipped with such an insulation module.

BACKGROUND

The interior of a motor vehicle is usually lined on their floor with a carpet. In addition, an insulation module is usually located underneath such a carpet, which insulates the carpet against the vehicle body with regard to temperature and sound in order to thereby ensure a pleasant atmosphere in the interior of the motor vehicle.

Generally, there are different types of such insulation modules including foam modules and fiber materials. In the case of a foam module, the same is directly foamed onto the carpet with which the floor side is to be lined during the manufacture.

In the case of a module consisting of a fiber material (the term "fiber material" includes mixtures which in addition to fiber materials also contain further substances such as foam particles and binding fibers), is usually produced separately from the carpet. For this purpose, the fiber material is filled in a molding tool, which having the form of a finished insulation module, then molded/bound in the tool. When the insulation module is removed from the tool, it takes a shape which matches a contour of the floor of the motor vehicle in which the insulation module is to be inserted. In other words, the insulation module leaves the molding tool as finished pre-molded element.

The mentioned filling process however proves to be difficult in such places of the molding tool which include surfaces which run perpendicular to or approximately perpendicular to one another, since the fiber material cannot be deposited in these locations without limitations. This results in that frequently no uniform density can be created in the insulation module.

Furthermore, when closing the molding tool there is the problem that the fiber material is displaced and cannot therefore be molded in the desired position in a process-secure manner.

SUMMARY

The present disclosure provides an insulation module which can be easily and precisely produced. According to embodiments of the present disclosure, an insulation module for a floor of a motor vehicle includes a panel of a molded and bound fiber material. The panel extends along a longitudinal axis (X) and includes at least one notch in thickness direction (D) of the panel, which extends at an angle $\alpha$ between 0° and ±30° to the longitudinal axis. At least one incision is formed in an outer edge of the panel, which incision extends at an angle $\beta$ between 80° and 100° to the longitudinal axis X of the panel.

The term "molded and bound fiber material", as used within the scope of the present disclosure, includes for example mixtures contain fibers such as polyethylene (PET) fibers and one or more of the following components: common fibers, binding fibers, foam flakes such as polyurethane (PUR) flakes. It should be noted that the above-mentioned are merely exemplarily and that the mixture can additionally contain further components.

As noted above, the notch extends at an angle $\alpha$ between 0° and ±30° to the longitudinal axis X of the panel. This means that it extends parallel or approximately parallel to the longitudinal axis or is inclined against the same at a relatively small angle. In other words, the notch is one that extends approximately in longitudinal direction. Along the notch, the panel can be folded without breaking. As a result, perpendicular or approximately perpendicular form profiles need no longer be formed during the pressing. On the contrary, a notch is made during the production of the insulation module according to the embodiments of the present disclosure in those places in which a perpendicular or approximately perpendicular bend is to be formed in the insulation module, so that when the insulation module is inserted in a motor vehicle, the insulation module can be folded in this location. In other words, the notch creates a hinge region in which the insulation module can be manually bent.

This configuration has the advantage that during the production the mentioned problems during the filling of the molding tool with the fiber material in those places can be avoided, since the molding tool no longer has to have such perpendicular or approximately perpendicular walls.

In addition, the insulation module, when it comes out of the molding tool, is flatter than the insulation modules of the prior art, in the case of which parts which run perpendicularly or approximately perpendicularly to one another are already molded during the production. This has the advantage that the packing of the insulation module can take place in a space-saving manner, as a result of which a packing density can be optimized during the transport. Because of this, the transport costs of a finished insulation module can be reduced.

In addition to this, an insulation module according to the embodiments of the present disclosure includes at least one incision in an outer edge of the panel, which incision extends at an angle $\beta$ between 80° and 100° to the longitudinal axis X. The incision thus extends perpendicular from or approximately perpendicular from an outer edge of the panel to the inside. The incision serves for compensating for the change in shape of the panel that is created on the at least one notch when bending the finished insulation module.

Furthermore, notches can also be present which extend approximately perpendicularly to the longitudinal axis X. These further notches are preferably arranged so that the notches are located in a rear region of the motor vehicle following the placing of the insulation module in a motor vehicle.

According to a configuration, the thickness (D) of the panel is reduced on the notch so far that the panel can be manually folded along the notch. Thus, no additional tools are required when the finished insulation module is placed onto a floor of a motor vehicle in order to fit the insulation module.

As far as the form of the insulation module is concerned, the panel can be constructed of two longitudinal panels, which are connected to one another via at least one transverse panel. The longitudinal panels and the one transverse panel are formed in one piece with one another. This rough form of an insulation module corresponds to the form in which the insulation module as a whole can be applied to the floor of a motor vehicle. Accordingly, no separate modules have to be produced for the driver side and the co-driver side.

According to an embodiment of the present disclosure, the notch can at least partly adjoin at least one incision. In this case, the stress or warpage that occurs in the place of the notch through a bending of the insulation mat is optimally compensated for. In particular, the notch or the notches in this embodiment of the insulation module can include two narrow sides each in top view. The notch with its narrow side adjoins an incision in each case. By way of the notch delimited by two incisions, a flap is created which results in that a region that is located between the two incisions, can be easily folded upwards (from the view of an insulation module lying in the vehicle).

As already mentioned, embodiments of the present disclosure also relate to a motor vehicle with an interior and a floor which delimits the interior downwards. An insulation module according to one of the preceding embodiments is placed. The panel of the insulation module is folded upwards at the notch. The insulation module on the floor of the motor vehicle ensures that the interior is insulated against sound and temperature.

Onto this insulation module, a carpet element is usually placed the form of which approximately corresponds to that of the insulation module, but which however is slightly larger than the insulation module, so that it slightly protrudes over the insulation module at its edges in order to conceal the insulation module from the user and impart the floor of the motor vehicle a uniform appearance. In this configuration, the panel is thus covered by a carpet element at least partly.

According to a further configuration of the present disclosure, the outer edge of the insulation module is at least partly covered by a trim element of the motor vehicle. Thus, the outer edge on these parts is not visible to a user of the motor vehicle, as a result of which the interior can be easily cleaned and offers a neat appearance.

BRIEF DESCRIPTION OF THE DRAWINGS

The present disclosure will hereinafter be described in conjunction with the following drawing figures, wherein like numerals denote like elements.

FIG. 2A shows an insulation module of the prior art immediately after its production in a perspective view;

FIG. 2B shows a carpet element, which is intended for lining a motor vehicle floor, in a perspective representation;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
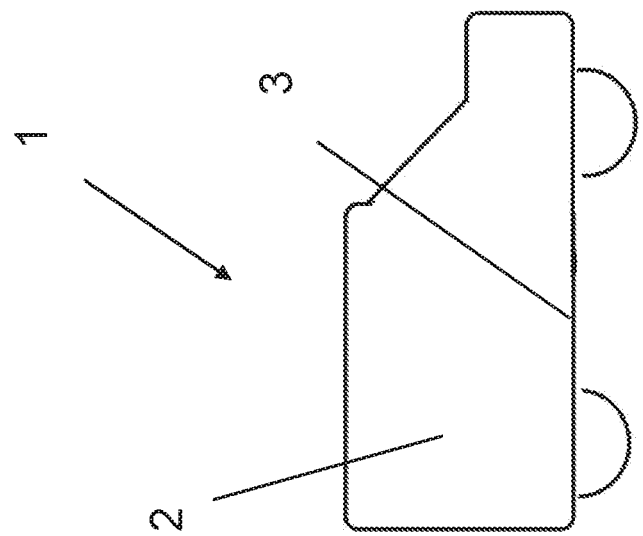
FIG. 1 is a cross-sectional view of a motor vehicle in a schematic representation.

In FIG. 1, a motor vehicle 1 is shown in a schematic representation in sectional view, which includes an interior 2 and a floor 3. As used herein, the term "floor" means an inner surface of the lower limit of the interior, as is illustrated by the reference number 3. It should be noted that the motor vehicle 1 is only sketched exemplarily and should not be interpreted as being restrictive. The motor vehicle can be any type of motor car, convertible, commercial vehicle, transporter and the like.

On the floor 3 of the motor vehicle 1, an insulation module 10' can be placed as is visible in the perspective representation of FIG. 2A. The insulation module 10' is known in the prior art and formed as a one-piece element. It is noticeable that the insulation module 10' is spatially structured and, in particular in edge regions, includes wall sections that steeply project upwards.

The production process of such steep walls, as already mentioned, is fraught with difficulties. In addition, the finished module construction is tall which increases the costs for the transport of such modules. As is shown in FIG. 2A, the insulation module of the prior art is placed onto the floor 3 of the motor vehicle 1 in the interior 2. Following this, a carpet element 4 is placed onto the insulation module 10' as exemplarily shown in FIG. 2B. As is evident, the carpet element 4 in this case is likewise formed in one piece and stiff, so that it can be inserted in the motor vehicle 1 as a whole.

Figure 3:
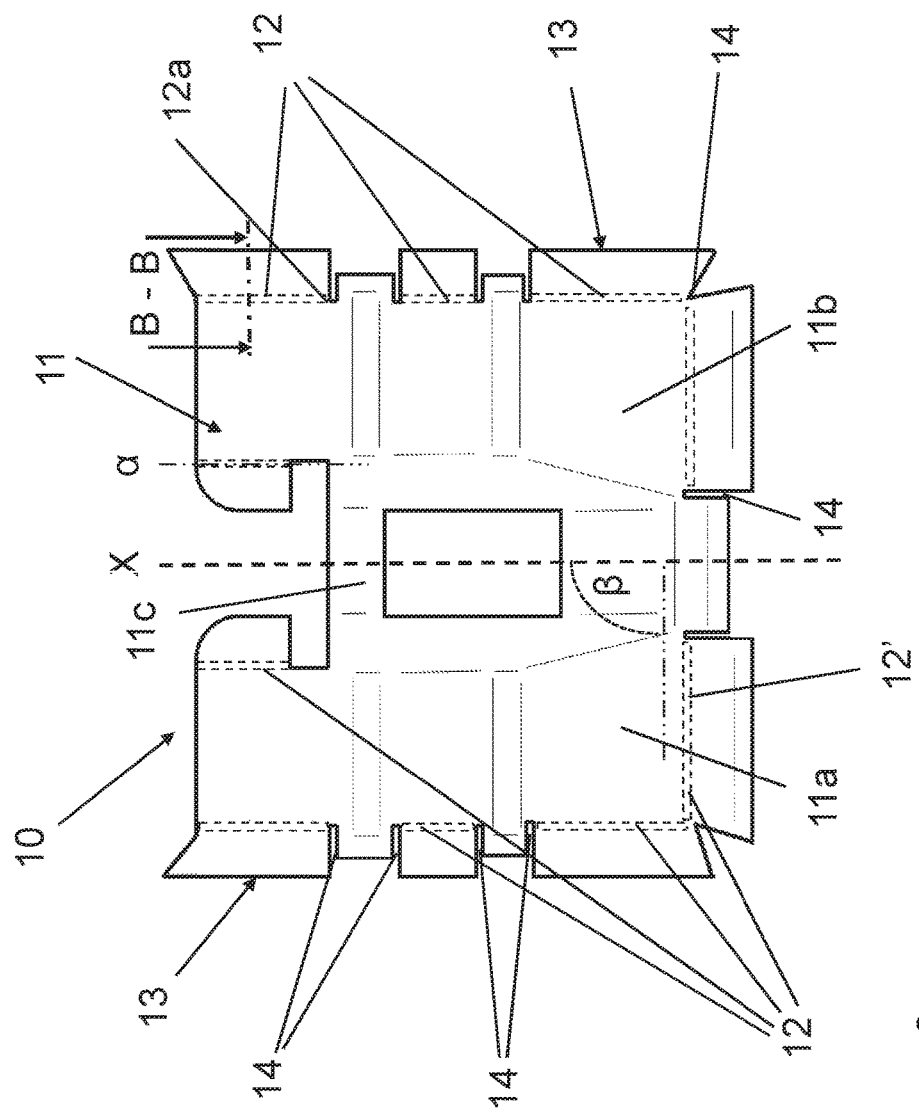
FIG. 3 shows an insulation module according to an embodiment of the present disclosure in top view in a schematic representation.

With reference to FIG. 3, an insulation module 10 according to an embodiment of the present disclosure is now described. The insulation module 10, which is visible here in top view in a simplified manner, i.e. without the fine structures shown in FIG. 2A, is constructed from a panel 11 of a molded and bound fiber material. The panel 11 in this case includes three part regions, namely two longitudinal panels 11a, 11b and one transverse panel 11c. Here, the panel 11 is constructed of the three part regions in one piece. According to an alternative, the individual longitudinal and transverse panels 11a, 11b, 11c can also be produced separately and subsequently joined, e.g. glued.

Above all in the vicinity of edge regions, there are multiple notches 12, 12', here a total of ten notches 12, 12', of which a plurality (here eight notches 12) substantially extend in the direction of a longitudinal axis X of the insulation module 10. In other words, an angle α between the respective notches 12 and the direction of the longitudinal axis X in this case is equal to 0°. These notches 12 in this case run parallel to the longitudinal axis X of the insulation module. Furthermore, as shown here, notches 12' can be present which extend approximately perpendicularly to the longitudinal axis X. The term "approximately" in this case is to mean an angle between 80° and 100° to the longitudinal axis.

However this is only optional. The notches may also extend at a small angle α to the direction of the longitudinal axis X, which can for example be in a range between 0° and 30°. Here, the notches 12, 12' are shown in dashed lines which serve to indicate that a thickness of the panel 11 is reduced in these places. In other words, the notches 12, 12' do not constitute any apertures through the fiber material of the panel 11, but are embodied merely as recesses in the fiber material.

As will be explained below, the notches 12 are present in those places in which the insulation module 10, on being placed on the floor 3 of a motor vehicle 1, abuts a steep wall. In these places, the panel 11 can be bent over upwards in order to fit the finished insulation module 10 to the structure of the interior 2 of the motor vehicle 1.

At an outer edge 13 of the panel 11, multiple incisions 14 are additionally present, which extend to the inside from the outer edge 13 at an angle β to the direction of the longitudinal axis. As is evident in the shown example, the angle β in this case amounts to 90°, wherein however other angles near 90° can also be conceivable, for example 70° to 120° or 80° to 110°. The incisions 14 serve for offsetting stresses and warpages which are created in the panel by the folding at the notches 12. For this purpose, the incisions 14 are frequently adjacent to the notches 12 or abutting the same.

Figure 4:
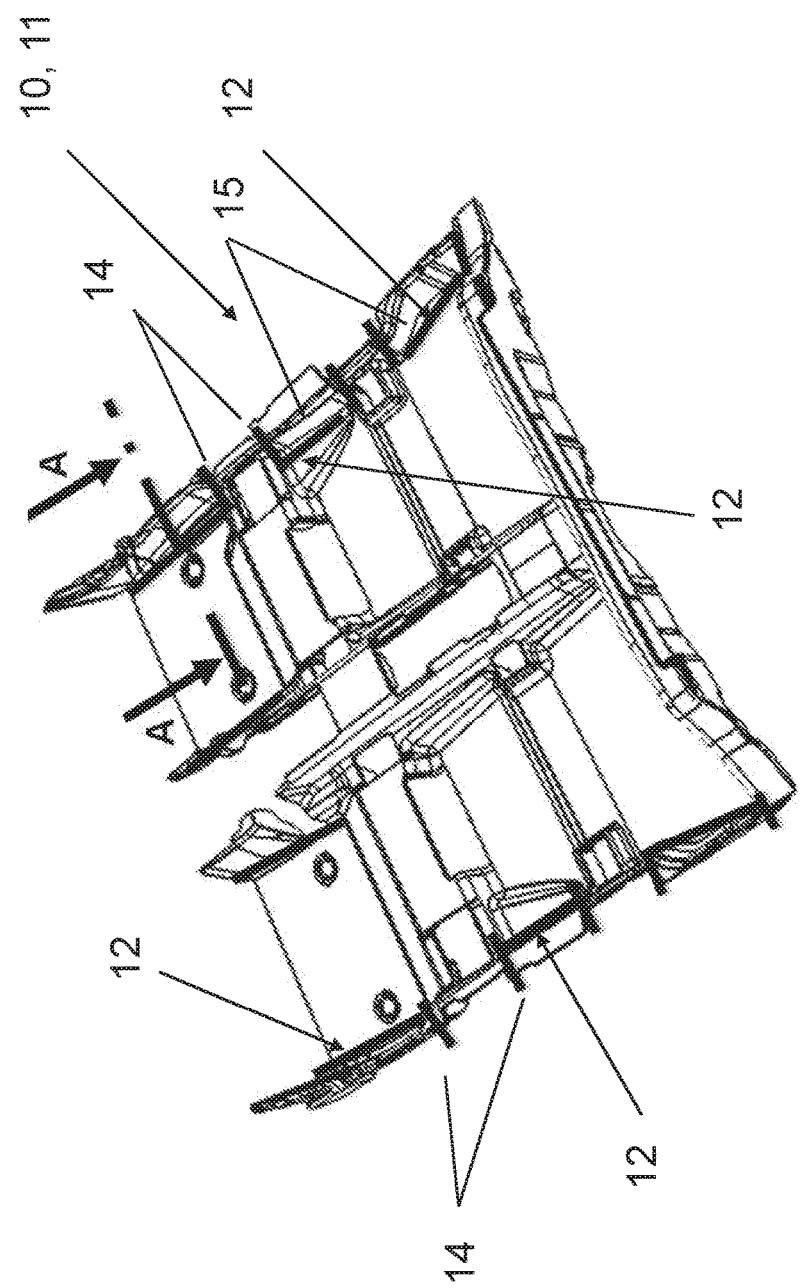
FIG. 4 shows an insulation module according to an embodiment of the present disclosure in the state of its insertion in a motor vehicle in a perspective view.

While in FIG. 3 the insulation module 10 is shown according to an embodiment of the present disclosure in its state immediately after the manufacture, the insulation module 10 is shown in FIG. 4 in the way in which it is installed in the motor vehicle 1.

As is evident, the material of the panel 11 is fold over upwards in the places in which the notches 12 are formed, so that wall sections 15 steeply projecting upwards are formed.

In the places of the incisions 14, which places in this figure are schematically indicated by bold bars for better identification, a compensation for raising the material of the panel 11 at the notches takes place.

With the embodiment of the present disclosure, an insulation module 10 can thus be created, which in the installed state is largely identical with the insulation module 10' of the prior art. However, the insulation module 10 according to the embodiment of the present disclosure can still be transported in the flat state, in which no folds at the notches 12 have yet been performed, as a result of which the transport costs can be reduced. In addition, the press/molding tools for producing the insulation module can be simplified since no vertical or steep walls have to be formed in them. The process of filling the press/molding tool with the fiber material, from which the panel 11 is to be formed, can be more easily controlled since the filling material can be process-securely deposited in the now flat tool regions and reduced density fluctuations of the components in the places in which steep walls are present are thus less threatening.

Figure 5B:
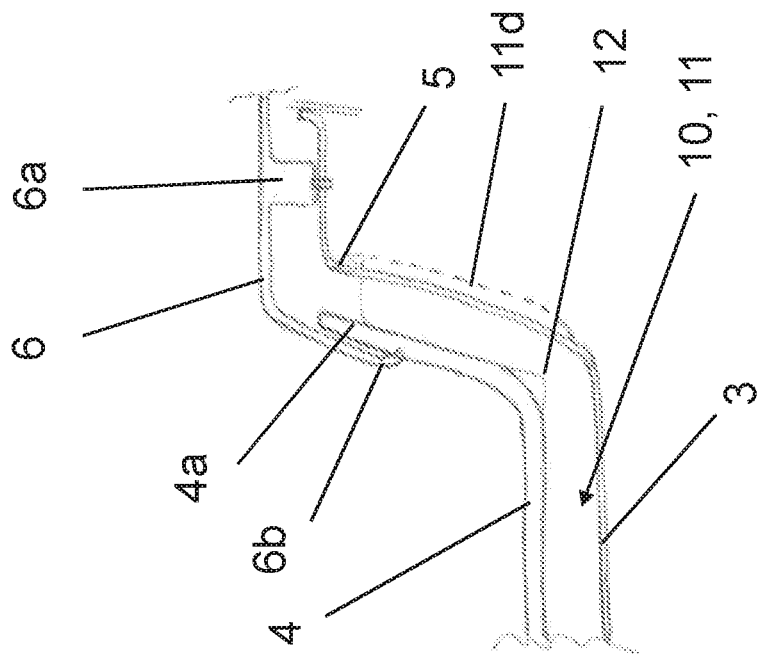
FIG. 5B shows a part view of an inserted insulation module along the section line A-A of FIG. 4.
Figure 5A:
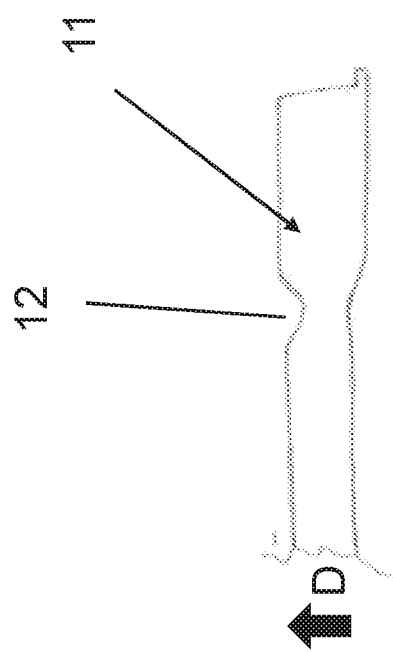
FIG. 5A shows a part view of the insulation module of FIG. 3 along the section line B-B.

In FIG. 5A a cross section through a part of the panel 11 of the insulation module 10 in the place B-B of FIG. 3 is shown. It is visible how at the notch 12 a thickness of the panel 11 in thickness direction D of the panel 11 is locally reduced. The notch 12 should preferentially be designed so that in this place the panel 11 can be manually bent or folded without it breaking in the process.

With respect to the representation of FIG. 5B, the principle of the installation of the insulation module 10 in a motor vehicle is now described. FIG. 5B shows the panel 11 of the insulation module 10 in the step in the place A-A of FIG. 4. Here, the panel 11 is supported on the floor 3 of a motor vehicle 1. The floor 3 laterally merges into a sill 5. As is evident, the floor 3 extends towards the sill 5 at a steep angle upwards. In order to form this place in the insulation element 10 of the embodiment of the present disclosure, a notch 12 is present there. In the shown representation, in which the insulation module 10 has already been inserted, the panel 11, at the place of the notch 12, has already been bent or folded upwards in order to follow the course of the floor 3. The notch 12 thus functions as a hinge that is installed in the panel 11.

On the insulation module 10 a carpet element 4 is located in the installed state, which likewise follows the course of the floor 3. On an upper region 4a of the carpet element 4, the same protrudes over the panel 11 of the insulation module 10 so that by way of this the view of the insulation module 10 from above is blocked.

The section shown in dashed lines in FIG. 5B is additional material 11d of the panel 11. It should be noted that this additional material 11d does not actually protrude over the floor/sill panel 3, as is shown here. The intention of this type of representation rather is to make clear that the panel 11 in this place can be thickened, i.e. can be formed with a greater thickness in thickness direction D in order to render the construction of panel 11 and carpet element 4 in this place even more compact in order to ensure a gap-free appearance between carpet and trim element.

Likewise, a matching of the gap dimension to the trim element without subsequent tool change is possible since via the filling process and the degree of filling (density) the gap appearance can be controlled via the backpressure that is created.

In an edge region, the construction of insulation material 10 and carpet element 4 is held by a trim element 6. The trim element 6 in this case is connected or anchored to the sill 5 of motor vehicle 1 at a fastening section 6a. On a region of the trim element 6 directed towards the floor 3 a clamping section 6b is located, which clamps the construction of insulation module 10 and carpet element 4 tight against the floor 3. In this way, the construction is held outside the field of vision of a user of the motor vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. An insulation module for a floor of a motor vehicle comprising a molded panel having a bound fiber material, the panel extending along a longitudinal axis and further comprising:
   a first notch in a thickness direction of the panel extending at an angle between 0° and 30° to the longitudinal axis, the first notch extending partially across the panel;
   wherein the panel has first and second outer edges extending substantially parallel to, and on opposite sides of, the longitudinal axis, and has third and fourth outer edges on opposite sides of the panel and extending substantially perpendicular to the longitudinal axis;
   a first incision in the first outer edge of the panel and extending at a first angle between 80° and 100° to the longitudinal axis of the panel;
   a second incision in the first outer edge of the panel and extending at a second angle between 80° and 100° to the longitudinal axis of the panel,
   wherein the first incision is nearer to the third outer edge than the second incision,
   wherein the first incision, in entirety, is spaced away from the third edge and second incision, in entirety, is spaced away from the fourth edge, the first and second incisions configured to offset stresses and warpages in the panel when folded at the first notch.

2. The insulation module according to claim 1, wherein the first notch reduces the thickness of the panel such that the panel is foldable along the first notch.

3. The insulation module according to claim 2, wherein the panel comprises two longitudinal panel regions connected to one another by at least one transverse panel region, wherein the longitudinal panel regions and the at least one transverse panel region form unitary piece.

4. The insulation module according to claim 2, further comprising a second notch extending approximately perpendicular to the longitudinal axis.

5. The insulation module according to claim 1, wherein the first notch at least partly adjoins the first and second incisions.

6. The insulation module according to claim 5, comprising a second notch, wherein the first incision adjoins the first notch and not the second notch, wherein the second incision adjoins the second notch and not the first notch.

7. An insulation module for a floor of a motor vehicle comprising a molded panel having two longitudinal panel regions connected to one another by at least one transverse panel region, wherein the longitudinal panel regions and the at least one transverse panel region form unitary piece of bound fiber material, the panel extending along a longitudinal axis and further comprising:
a first notch in a thickness direction of the panel including two narrow sides in top view, wherein the first notch extends approximately parallel to the longitudinal axis for reducing the thickness of the panel such that the panel is foldable along the first notch;
a first incision in a transverse outer edge of the panel and extending at an angle between 80° and 100° to the longitudinal axis of the panel, wherein each narrow side of the first notch at least partly adjoins the first incision;
a second notch in the thickness direction of the panel including two narrow sides in top view, wherein the second notch extends approximately parallel to the longitudinal axis, the first and second notches substantially colinear and spaced apart by a first section of the panel;
a second incision in a longitudinal outer edge of the panel, wherein each narrow side of the second notch at least partly adjoins the second incision,
wherein the first and second notches are configured for folding second and third sections of the panel independent of the first section.

8. A motor vehicle comprising:
an interior having a floor delimiting the interior in a downward direction;
an insulation module having a molded panel having a bound fiber material, wherein the panel extends along a longitudinal axis and further comprises a first notch in a thickness direction of the panel extending at an angle between 0° and 30° to the longitudinal axis, and at least one incision in an outer edge of the panel and extending at an angle between 80° and 100° to the longitudinal axis of the panel;
wherein the insulation module is placed on the floor and a section of the panel is configured to be folded upwards at the first notch,
wherein the section has a thickness greater than a remainder of the panel.

9. The motor vehicle according to claim 8, further comprising a carpet element at least partially covering the insulation module opposite the floor.

10. The motor vehicle according to claim 8, further comprising a trim element at least partially covering the outer edge of the insulation module, wherein the thickness of the section is configured to provide a gap-free appearance between the carpet element and the trim element.

* * * * *